Dec. 28, 1965  G. WIECKMANN  3,225,980
CLOTHES HANGER
Filed Aug. 2, 1963  3 Sheets-Sheet 1

INVENTOR.
GERHARD WIECKMANN
BY
William C. Babcock
ATTORNEY

Dec. 28, 1965  G. WIECKMANN  3,225,980
CLOTHES HANGER
Filed Aug. 2, 1963  3 Sheets-Sheet 2
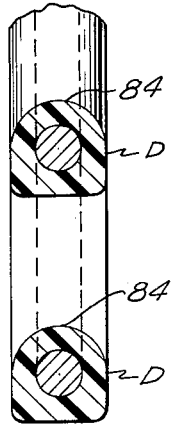
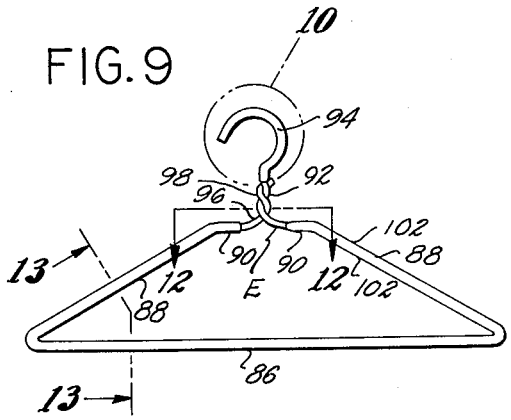
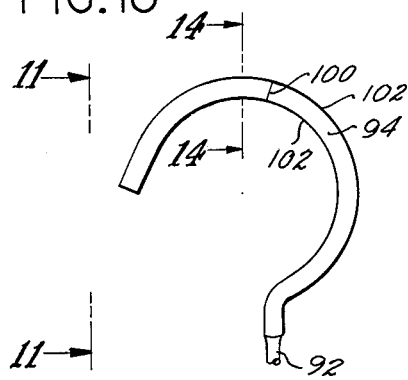
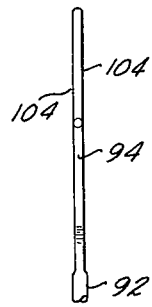
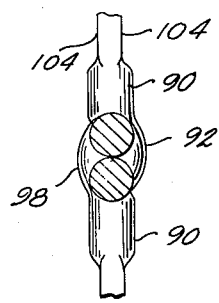
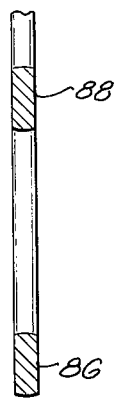
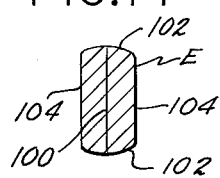
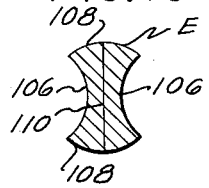
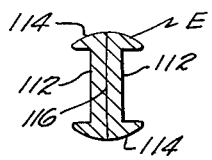
INVENTOR.
GERHARD WIECKMANN
BY
William C. Babcock
ATTORNEY Dec. 28, 1965
G. WIECKMANN
3,225,980
CLOTHES HANGER
Filed Aug. 2, 1963
3 Sheets-Sheet 3
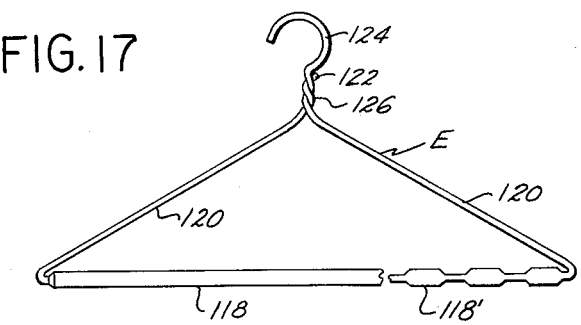
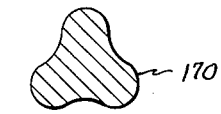
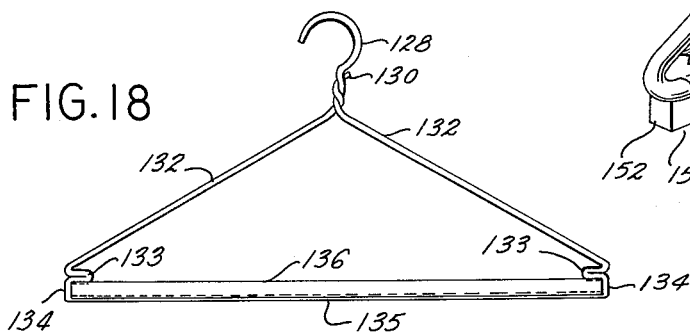
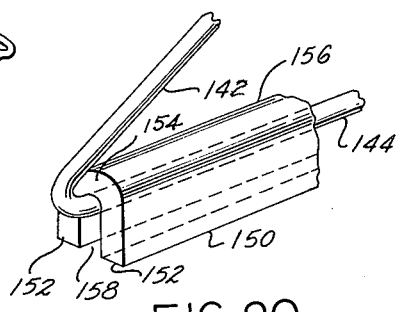
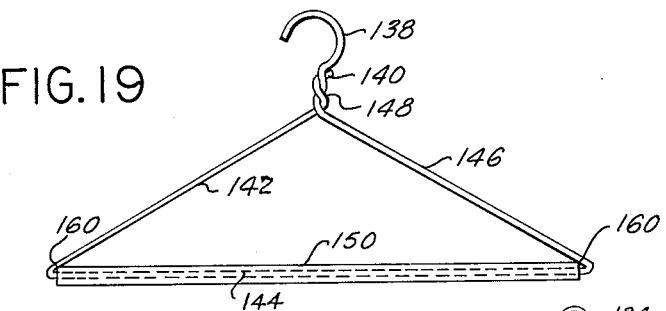
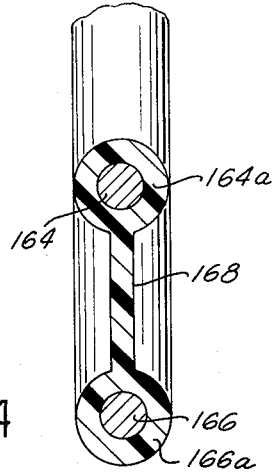
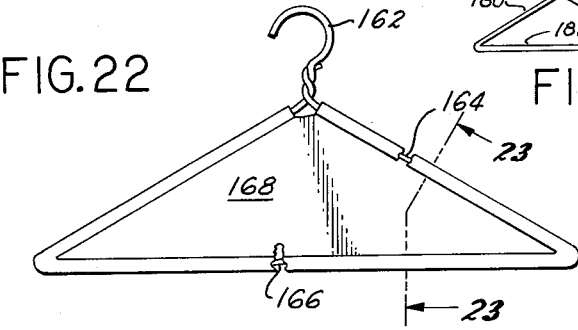
INVENTOR.
GERHARD WIECKMANN
BY
William C. Babcock
ATTORNEY United States Patent Office 3,225,980
Patented Dec. 28, 1965

1

3,225,980
CLOTHES HANGER
Gerhard Wieckmann, Los Angeles, Calif.
(15520 Budlong Place, Apt. 3, Gardena, Calif.)
Filed Aug. 2, 1963, Ser. No. 299,501
6 Claims. (Cl. 223—98)

The present invention relates generally to clothes supporting devices, and more particularly to a clothes hanger.

Millions of hangers are used annually for the support of clothes, especially men's suits when delivered from a cleaning establishment or retail store, or supported in the closet in a home, hotel, or the like. This is equally true with respect to women's and children's clothing as well. For many years it has been customary to fabricate such hangers from wire, which are normally given away with clothing as it is purchased or delivered from a cleaner. Accordingly, wire hangers must be retailed at a relatively low cost in the highly competitive field that exists for their manufacture. One of the major costs in the fabrication of wire hangers is the metal of the wire which serves as the raw material for their production.

While the wire clothes hangers of the type described are inexpensive, one disadvantage thereof is that when clothes are supported thereon they frequently become creased transversely caused by the thin wire portions on which they hang, as well as in the shoulders of coats, which gives an unsightly appearance to the clothing when worn.

To eliminate such creasing, cardboard forms are sometimes mounted on the cross portion of the hanger, or wooden frames of appreciable thickness are provided. However, while they eliminate transverse creasing, the wooden hangers are relatively expensive, and far too much so to be given away, except with expensive clothing. The cardboard forms used in conjunction with wire hangers also increase the cost thereof, but in addition, they are easily displaced from the hanger whereby the clothes fall from a supported position thereon.

A major object of the present invention is to provide a wire clothes hanger that requires the use of less metal in the fabrication thereof than those available heretofore that are substantially heavier, yet which has the same or greater structural strength for the support of clothing.

Another object of the invention is to supply a wire clothes hanger that is structurally simple, easy to fabricate, and one that can be retailed at a substantially lower price than previously available clothes hangers of this type.

Another object of the invention is to supply a clothes hanger embodying both a wire material and a moldable foamed material such as a polymerized resin in the fabrication thereof which provides all of the advantages of a wooden hanger at considerably lower cost.

These and other objects and advantages of the invention will become apparent from the following description of a number of forms thereof, and from the accompanying drawings illustrating those forms, in which.

2

Figure 5:
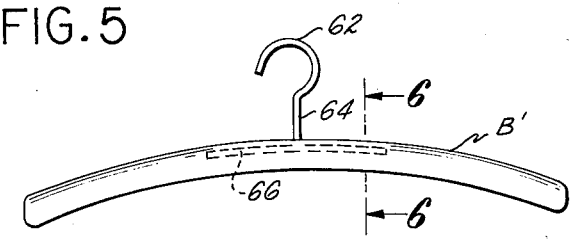
Figure 6:
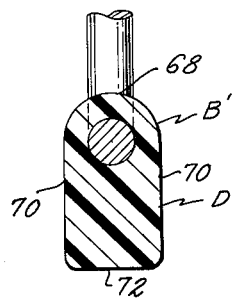
Figure 7:
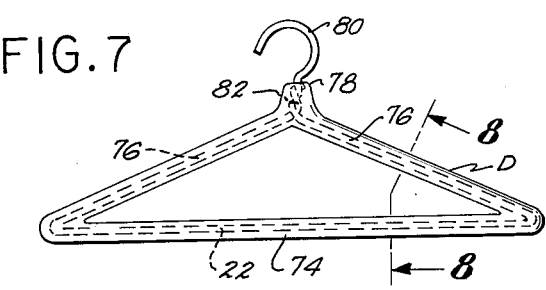

FIGURE 5 is a side elevational view of a third form of clothes hanger which provides the same operational advantages as the second form thereof;

FIGURE 6 is a fragmentary vertical cross-sectional view of the third form of hanger, taken on the line 6—6 of FIGURE 5;

FIGURE 7 illustrates a fourth form of clothes hanger that will support both a coat and a pair of trousers, or a skirt, with a minimum of transverse creasing thereof;

FIGURE 8 is a fragmentary vertical, cross-sectional view of the fourth form of hanger shown in FIGURE 7, taken on the line 8—8 thereof;

FIGURE 9 is a side elevational view of an inexpensive wire clothes hanger of such structure that a minimum of metallic material is employed in the fabrication thereof;

FIGURE 10 is a fragmentary side elevational view of a part of the hanger shown in FIGURE 9, taken within the confines of the circle shown in phantom line in that figure and identified by the numeral 10;

FIGURE 11 is an end elevational view of that portion of the device shown in FIGURE 10, taken on the line 11—11 thereof;

FIGURE 12 is a fragmentary horizontal, cross-sectional view of that portion of the hanger shown in FIGURE 9, taken on the line 12—12 thereof;

FIGURE 13 is a fragmentary, cross-sectional view of a portion of the hanger shown in FIGURE 9, taken on the line 13—13 thereof;

FIGURE 14 is a transverse, cross-sectional view of a shape to which the flattened wire shown in FIGURES 10 and 13 may be formed to increase the strength and load capacity of a hanger;

FIGURE 15 is another transverse, cross-sectional view showing the wire portion of the hanger illustrated in FIGURES 10 and 13 which can be formed to increase the strength and load capacity of a hanger in two directions normal relative to one another;

FIGURE 16 is a transverse, cross-sectional view of another shape to which the wire can be formed;

FIGURE 17 is a side elevational view of a sixth form of hanger;

FIGURE 18 is a side elevational view of a seventh form of hanger;

FIGURE 19 is a side elevational view of an eighth form of hanger;

FIGURE 20 is a fragmentary perspective view of a portion of the hanger shown in FIGURE 19 illustrating the manner in which a part of the cross portion thereof is supported in place thereon;

FIGURE 21 is another transverse cross-sectional view showing the manner in which the wire portion of the hanger shown in FIGURES 10-13 can be shaped to increase the strength and load-bearing capacity of a hanger in three different directions;

FIGURE 22 is a perspective view of a ninth form of hanger;

FIGURE 23 is a transverse cross-sectional view of the hanger shown in FIGURE 22, taken on the line 23—23 thereof; and FIGURE 24 is a side elevational view of a tenth form of clothes hanger.

Figure 1:
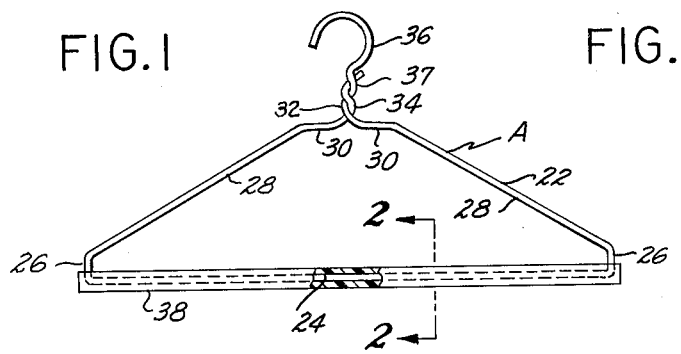
FIGURE 1 is a side elevational view of a clothes hanger fabricated from both wire and a polymerized resin foamed material which minimizes the transverse creasing of trousers or skirts when supported from the cross bar thereof.

With continuing reference to the drawings for the general arrangement of the first form of the invention, it will be seen in FIGURE 1 to include a hanger A that is fabricated from a single length of metallic wire 22, such as steel or the like, which by bending or otherwise forming, has been shaped to define a cross piece 24. The ends of the cross piece 24 develop into two short upwardly projecting legs 26 that have shoulder portions 28 extending therefrom.

The upper portions of shoulders 28 develop into two short extensions 30 that in turn develop into sections 32 and 34 of different lengths. The longer section 32 is bent to define a hook 36. Below the hook 36, sections 32 and 34 are twisted one upon the other, as may be seen at 37 in FIGURE 1.

Figure 2:
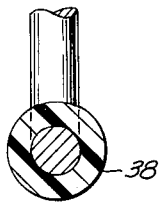
FIGURE 2 is a fragmentary transverse cross-sectional view of the hanger shown in FIGURE 1, taken on the line 2—2 thereof.

The cross piece 24, as may best be seen in FIGURES 1 and 2, has an elongate body 38 fabricated of a polymerized resin foamed material formed therearound. This resin preferably has a closed cellular structure to minimize the weight of the device as a whole, as well as to minimize the cost thereof. The elongate body 38 (FIGURE 2) is of substantial thickness, whereby when a pair of trousers or a skirt is supported therefrom, a minimum of transverse creasing will be imparted to the garment. The elongate body 38 cooperates with the balance of the hanger A shown in FIGURES 1 and 2 to provide a strong, yet lightweight clothes hanger having certain advantages of a wooden hanger without occupying as much space and at but a fraction of the cost thereof.

Figure 3:
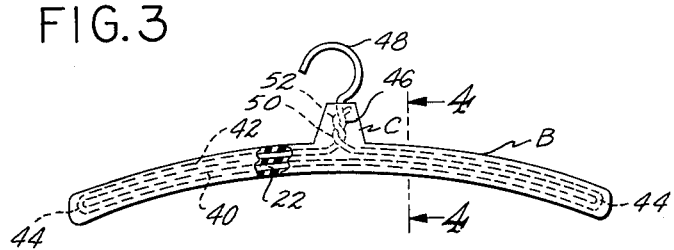
FIGURE 3 is a side elevational view of a second form of clothes hanger fabricated from both wire and a moldable foamed material that imparts a minimum of transverse creasing to the garment supported therefrom.

A second form of clothes hanger that provides all of the advantages of a wooden structure, but is considerably less costly to produce and is lighter in weight is shown in FIGURE 3. This device comprises a single length of wire 22 which is bent to define a lower arcuate section 40 and an upper arcuate section 42 that are connected at the ends thereof by short portions 44.

The upper section 42 develops into two upwardly extending portions. One of these portions 46 is bent to define a hook 48. That part of portion 46 below the hook 48 and the other portion 50 are twisted upon one another in the manner shown at 52 in FIGURE 3. The sections 40 and 42, end portions 44, together with the portions 46 and 50, as well as the twisted parts 52, are completely enclosed in an elongate body B, which has a centrally disposed, upwardly projecting extension C formed thereon, as shown in FIGURE 3.

Figure 4:
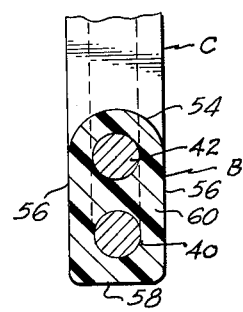
FIGURE 4 is a fragmentary vertical cross-sectional view of a portion of the second form of hanger shown in FIGURE 3, taken on the line 4—4 thereof.

The transverse cross section of the body B on each side of the extension C is shown in FIGURE 4. Body B is preferably formed with a convex upper surface 54 and two straight side walls 56 that extend downwardly from the upper surface to merge into opposite ends of a straight cross surface 58. The body B, as well as its extension C, are preferably molded around the sections 40 and 42, end portions 44, together with the portions 46 and 50, from a foamed polymerized resin 60 that is light in weight but which has sufficient structural strength to support a garment from the upper surface 54 thereof. The second form of the hanger shown in FIGURES 3 and 4 provides the advantages of attractive appearance, light weight, production economy, and due to the fact that the foamed material 60 is adapted to receive coloring pigment, the name of business establishments may be imprinted on the body B or extension C at the time of manufacture.

A third form of hanger is shown in FIGURES 5 and 6 that is fabricated from wire, such as steel or the like. The wire is formed to define a hook 62 from which an extension 64 depends that develops into a cross piece 66. Cross piece 66 is embedded in an elongate body B', which like body B, is fabricated from a foamed polymerized resin, or like lightweight material, and is sufficiently strong structurally to support a garment from the upper edge thereof. In cross section, the body B' is defined by a convex upper surface 68 having two straight side walls 70 extending downwardly therefrom, the lower ends of which develop into a flat lower surface 72.

A fourth form of hanger is shown in FIGURE 7 that is preferably fabricated from a single length of wire 22 which is bent or formed to define a cross piece 74. The ends of cross piece 74 develop into two upwardly and inwardly extending shoulder portions 76. One shoulder portion 76 develops into an upwardly extending leg 78 which terminates in a hook 80 at the upper end thereof. An extension of the other shoulder 76 is tightly wound in a spiral 82 about the leg 78.

The cross piece 74, shoulder portions 76, the spiral 82, and a portion of the leg 78 are fully encased in a foamed polymerized resin body D that conforms to the shape thereof. The upper surface 84 of both the shoulder portions and cross piece of the body D are convex, and sufficiently wide that a minimum of transverse creasing is imparted to any garment supported therefrom.

A fifth form of clothes hanger is shown in FIGURES 9–13 inclusive, in which the weight of the metallic wire used therein is reduced, whereby a saving in production cost thereof is realized. This form of the invention is fabricated from a wire E that is of a lesser gauge than that normally utilized for this purpose.

A single length of the wire E is bent to define a cross piece 86, the ends of which develop into two upwardly and inwardly extending shoulder portions 88. The adjacent upper ends of shoulders 88 develop into two short legs 90, from one of which an extension 92 projects upwardly that terminates in a hook 94. The other leg 90 develops into an extension 96 that is tightly wound about extension 92 to define a spiral 98 thereon below the hook 94. Pressure is applied to the hook 94, legs 90, shoulder portions 88, and cross piece 86, to flatten them into a rectangular transverse cross section having a major axis 100. As will be seen in the drawings, the major axis 100 is parallel to the direction in which a load is applied to the clothes hanger. The flattened portions of the fifth form of clothes hanger resist deformation when a downwardly applied force is applied thereto, and to the extent that it can support a substantial load, such as that of a coat, on the shoulder portions 88 thereof, together with a pair of trousers or skirt on the cross piece 86 without sag.

The flattened portions of the fifth form of the invention are formed from wire E that initially is of circular transverse cross section. Accordingly, after the flattening operation has taken place, the opposite longitudinal sides 104 of the wire E will be substantially parallel, but the end edges 102 thereof will be of convex curvature, as can best be seen in FIGURE 14.

Flattening of the hanger portions (FIGURE 9) just described can be effected by use of two pressure members (not shown) having straight, adjacently disposed contacting surfaces that are parallel. However, flattening of wire E need not be limited to a cross section that is substantially rectangular, but by utilizing pressure exerting members (not shown) having convex engaging surfaces, the wire may be so flattened as to have longitudinally extending portions such as shown in FIGURE 15. When the wire E is flattened by contact with two convex pressure exerting surfaces (not shown), it is flattened to define two concave longitudinally extending side surfaces 106, the end surfaces of which are defined by two oppositely curved convex end surfaces 108. The major axis 110 of this flattened portion (FIGURE 15) extends between the two edge surfaces 108.

By applying pressure to the wire, the flattened portion shown in FIGURE 9 may be formed to define the transverse cross section shown in FIGURE 16. When so deformed, the wire E has two longitudinally extending recesses 112 formed in the sides thereof, and that portion of the wire is not subjected to this pressure remains in the form of two arcuate segments 114, as may be seen in FIGURE 16. In this deformation of the wire E the major axis 116 of the flattened portion extends between the arcuate segments 114. Flattening of wire E to a cross section such as illustrated in FIGURES 15, 16 or 21 increases the resistance of the wire against deformation when the fifth form of the clothes hanger is in use.

A sixth form of clothes hanger is shown in FIGURE 17 which is formed from a single length of steel wire E that is bent or otherwise formed to define a cross piece 118, from the ends of which two shoulder portions 120 extend upwardly. One shoulder 120 has a leg 122 that projects upwardly therefrom and is bent to define a hook 124. The other shoulder 120 also has a leg 122 extending upwardly therefrom. Parts of the legs 122 are twisted together at 126 as shown in FIGURE 17. The cross piece 118 of the sixth form of hanger is flattened into one of the transverse cross sections shown in FIGURES 14, 15, 16 or 21, which minimizes the weight of the material going into the sixth form of hanger and permits the use of wire E of lesser gauge in the construction thereof than would otherwise be possible.

A seventh form of hanger is shown in FIGURE 18 that includes a hook 128 from which a first leg 130 depends. A second leg 130 is twisted about the first leg 130 below hook 128. Two shoulder portions 132 extend outwardly in opposing directions from the lower extremities of legs 130. The lower ends of shoulders 132 are doubled over to provide two inwardly extending engaging members 133 which develop into two short projections 134. Projections 134 support a cross piece 135 therebetween.

An elongate rod 136 of lightweight material, such as a foamed polymerized resin, is provided and at least the ends thereof are pressure gripped between engaging members 133 and cross piece 135. This pressure gripping is of sufficient magnitude that at least the engaging members 133 and a part of the cross piece 135 indent the rod 136 to hold it firmly in position in the hanger. The diameter of rod 136 is sufficiently great that no appreciable transverse creasing is imparted to garments when supported thereon.

The eighth form of hanger is shown in FIGURE 19, which is likewise fabricated from wire E and is bent to define a hook 138 from which a leg 140 depends. The lower end of leg 140 develops into a shoulder portion 142, the lower extremity of which is bent to form a horizontally extending cross piece 144. Cross piece 144 in turn develops into a second shoulder portion 146 that leads upwardly at an angle towards leg 140 and has the upper portion thereof twisted about the leg at 148.

An elongate support 150 fabricated from a polymerized resin, preferably a foamed resin, is provided, which is of inverted U-shaped cross section and defined by two legs 152. The upper ends of legs 152 are connected by a web 154, which has a convex upper transverse surface 156 on which a garment can be supported. Legs 152 define a longitudinal recess 158 therebetween in which the cross piece 144 is inserted with the support 150 resting on the interior surface of web 154. The upper end portions 160 of the support 150 abut against the lower interior portions of the shoulders 142 and 146 whereby the support is held in a non-rotatable position on the cross piece 144.

In forming flattened portions of the hanger in the manner described, the shoulder portions and the cross pieces, as well as the hooks may be continuously flattened, or in longitudinally spaced segments, as shown to the right in FIGURE 17. These alternate flattened segments are identified by the numeral 118′ in the form of the invention shown in this figure.

A ninth form of the invention is shown in FIGURES 22 and 23, which includes a wire hook 162, shoulder portions 164, with a cross piece 166 extending between the lower extremities of the shoulder portions. Shoulders 164 and cross piece 166 have a web 168 of foamed polymerized resin extending therebetween. Advertising or other indicia (not shown) may be imprinted on web 168. Web 168 includes longitudinally extending beads 164a and 166a that envelop the shoulder portions 164 and cross piece 166 respectively, as best seen in FIGURE 23.

FIGURE 21 illustrates another hanger shape 170, in addition to those shown in FIGURES 14–16 inclusive, into which the wire defining a hanger may be formed. By use of the shapes shown in FIGURES 14–16 inclusive, and FIGURE 21, a lighter gauge wire can be used in the formation of hangers, and due to the shaped wire, these hangers will have a greater load-bearing capacity than if formed from wire of circular transverse cross section.

In the forming of wire to the shapes described, the length of the wire is substantially increased, for a fifteen percent elongation can be obtained without difficulty. This fifteen percent elongation, of course, permits fifteen percent more hangers to be formed from the same coil of wire, with the cost of each hanger so formed substantially reduced, and the load-bearing capacity thereof increased. In the event it is not desired to increase the load-bearing of a hanger, a lighter gauge wire can be used in the fabrication thereof, providing it is deformed to one of the transverse shapes described herein, or a transverse shape equivalent to one of the shapes shown in FIGURES 14, 15, 16 or 21.

If desired, wire formed to one of the shapes shown in FIGURES 14, 15, 16 or 21 can be used to form an entire hanger as shown in FIGURE 24 that includes two shoulder portions 180, cross piece 182, hook 184 and twisted portion 186.

The use of the inventions previously described and illustrated, of course, are obvious, and accordingly further explanatory material in this regard is not considered necessary.

Although the present invention is fully capable of achieving the objects and providing the advantages hereinbefore mentioned, it is to be understood that it is merely illustrative of the presently preferred embodiments thereof, and I do not mean to be limited to the details of construction herein shown and described, other than as defined in the appended claims.

I claim:

1. A metallic wire clothes hanger that includes a hook, from the lower end of which two shoulder portions project downwardly and outwardly, and a cross piece that extends between the lower ends of said shoulder portions, which hanger is characterized by said wire which defines said cross piece and at least the lower parts of said shoulder portions adjacent thereto that are permanently deformed to an elongate transverse cross section, with the major axis of said transverse cross section being substantially parallel to the direction in which a load is applied to said hanger by at least one garment supported thereon.

2. A metallic wire clothes hanger that includes a hook, from the lower end of which two shoulder portions project downwardly and outwardly, and a cross piece that extends between the lower ends of said shoulder portions, which hanger is characterized by longitudinally spaced portions of said cross piece which are permanently deformed to an elongate transverse cross section, with the major axis of said transverse cross section being substantially parallel to a common plane in which said hook, shoulder portions and cross piece lie.

3. A wire clothes hanger as defined in claim 1 wherein said wire defining said hook is also deformed to said elongate transverse cross section.

4. A clothes hanger formed entirely from wire to include a hook, from the lower end of which hook two shoulder portions extend downwardly and outwardly, with a cross piece extending between the lower ends of said shoulder portions, which hanger is characterized by the wire defining at least a portion thereof having been permanently deformed to a transverse elongate cross section having two convex end surfaces and two concave side surfaces, with the major axis of said cross section being parallel to the direction in which a load is applied to said hanger.

5. A clothes hanger formed entirely from wire to include a hook, from the lower end of which hook two shoulder portions extend downwardly and outwardly, with a cross piece extending between the lower ends of said shoulder portions, which hanger is characterized by the wire defining at least a portion thereof having been permanently deformed to a transverse elongate cross section having two convex end surfaces and two longitudinally extending recessed side surfaces, with the major axis of said cross sections being parallel to the direction in which a load is applied to said hanger.

6. A clothes hanger including a hook, from the lower end of which hook two shoulder portions extend downwardly and outwardly, with a cross piece extending between the lower ends of said shoulder portions, said hook, cross piece and shoulder portions being formed entirely from wire which hanger is further characterized by resin beads that envelop said shoulder portions and cross piece, said beads having an integral web of resin extending therebetween.

References Cited by the Examiner

UNITED STATES PATENTS

| | | | |
|---|---|---|---|
| D. 136,082 | 8/1943 | Schreiber | 223—88 |
| D. 140,338 | 2/1945 | Hill | 223—88 |
| D. 148,407 | 1/1948 | Cleary | 223—88 X |
| D. 190,308 | 5/1961 | Gross | 223—88 X |
| 1,470,925 | 10/1923 | Klein et al. | 223—87 |
| 1,574,065 | 2/1926 | Coney | 223—88 |
| 1,885,263 | 11/1932 | Hulett | 223—98 X |
| 1,963,163 | 6/1934 | Young | 223—88 |
| 2,160,173 | 5/1939 | Ruen | 223—92 |
| 2,412,735 | 12/1946 | Isaak | 223—88 |
| 2,426,556 | 8/1947 | Kohl | 223—88 |
| 2,585,715 | 2/1952 | Youngblood | 223—98 |
| 2,587,743 | 3/1952 | Mackey | 223—88 |
| 2,591,234 | 4/1952 | Burns | 223—88 |
| 2,643,036 | 6/1953 | Schiffman | 223—88 |
| 2,678,149 | 5/1954 | Walther | 223—92 |
| 2,813,668 | 11/1957 | Griffis | 223—98 |
| 2,878,978 | 3/1959 | Glowka | 223—98 |
| 2,904,233 | 9/1959 | Brothers | 223—88 |
| 3,059,824 | 10/1962 | Henry | 223—88 |
| 3,153,499 | 10/1964 | Babiskin et al. | 223—88 |

JORDAN FRANKLIN, *Primary Examiner.*

DAVID J. WILLIAMOWSKY, *Examiner.*